United States Patent
Kim

(10) Patent No.: US 7,773,155 B2
(45) Date of Patent: Aug. 10, 2010

(54) BROADCASTING SIGNAL RECEIVER AND CONTROL METHOD THEREOF

(75) Inventor: Je-ik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1023 days.

(21) Appl. No.: 11/482,744

(22) Filed: Jul. 10, 2006

(65) Prior Publication Data

US 2007/0058083 A1 Mar. 15, 2007

(30) Foreign Application Priority Data

Sep. 12, 2005 (KR) ...................... 10-2005-0084683

(51) Int. Cl.
*H04N 3/27* (2006.01)
*H04N 5/44* (2006.01)
*H04N 5/50* (2006.01)

(52) U.S. Cl. .................. 348/554; 348/725; 348/731

(58) Field of Classification Search .............. 348/554, 348/725, 731–733, 705, 706; 725/38, 59, 725/61; 455/179.1, 180.1, 182.3, 192.3; *H04N 5/44, H04N 3/27, 5/50, 5/268*
See application file for complete search history.

(56) References Cited

U.S. PATENT DOCUMENTS 6,741,293 B1 * 5/2004 Obuchi ....................... 348/554
7,663,703 B2 * 2/2010 Kang .......................... 348/731

FOREIGN PATENT DOCUMENTS

| JP | 2002-094889 A | 3/2002 |
| KR | 1999-0081003 A | 11/1999 |
| KR | 2003-0027514 A | 4/2003 |

* cited by examiner

*Primary Examiner*—Sherrie Hsia
(74) *Attorney, Agent, or Firm*—Sughrue Mion, PLLC

(57) ABSTRACT

A broadcasting signal receiver and a method of controlling the broadcasting signal receiver having a user selection unit, the method including: determining whether a plurality of channels that correspond to a selected channel exist; determining whether the plurality of channels have the same contents if it is determined that the plurality of channels exist; selecting a first channel among the plurality of channels according to a priority if it is determined that the plurality of channels have the same contents; and determining whether the first channel provides a corresponding signal; and selecting a second channel among the plurality of channels according to the priority if it is determined that the first channel does not provide the corresponding signal.

18 Claims, 3 Drawing Sheets

BROADCASTING SIGNAL RECEIVER AND CONTROL METHOD THEREOF

CROSS-REFERENCE TO RELATED APPLICATIONS

This application claims priority from Korean Patent Application No. 10-2005-0084683, filed on Sep. 12, 2005, in the Korean Intellectual Property Office, the disclosure of which is incorporated herein by reference.

BACKGROUND OF THE INVENTION

1. Field of the Invention

Apparatuses and methods consistent with the present invention relate to a broadcasting signal receiver and a control method thereof, and more particularly, to a broadcasting signal receiver and a control method thereof, which selects a particular channel when a plurality of analogous channels exist.

2. Description of the Related Art

Terrestrial broadcasting is now provided in the form of analog broadcasting and digital broadcasting. Therefore, the same contents can be transmitted through both the analog and digital broadcasting forms. For example, contents of a broadcasting network can be shown through an analog channel number of 7 and a digital channel number of 7-1. When a user selects a numeral key of '7' using a remote controller, it is unclear which one of the two channels is to be tuned and displayed.

In a related art television (TV), a method of selecting a channel will be described with reference to FIG. 1. FIG. 1 is a flowchart showing a method of selecting a channel among analogous channels in the related art.

At operation 100 when a user selects a certain channel, e.g., a channel number of 11 through a remote controller, at operation 101 the TV compares the contents of a digital channel number of 11-1 with the contents of an analog channel number of 11. At this time, in the case where only one of an analog or digital channel exists corresponding to the selected channel, the existing channel is immediately tuned and displayed.

At operation 102, the TV determines whether the contents of two channels are identical on the basis of program information such as a program name, a program time and the like. In the case where the two channels differ in their contents, at operation 103 the TV displays information about the contents of each channel option through an on screen display (OSD), thereby showing a user the program information corresponding to the currently selected channel. Then, a user can select a desired channel between the analog and digital channels by manipulating a key provided in the remote controller at operation 104. According to the selection of a user, the TV is tuned to the selected channel and displays the contents of the tuned channel on its screen at operation 105.

On the other hand, in the case where the contents of the digital and analog channels are identical, the TV displays the contents of the digital channel at operation 106. Herein, the TV processes in consideration of the picture qualities of the digital channel and the analog channel.

However, the related art TV is set to unconditionally select the digital channel among analogous channels in the case where the contents of the analogous channels are identical. Thus, when the digital channel shows no image because the digital channel has a weak broadcasting signal or no broadcasting signal, it is impossible to change the digital channel into the analog channel in spite of repeated selection of the desired channel number even though the analog channel can show a user the corresponding broadcast.

Further, there are various broadcasting modes such as a cable broadcasting mode, or a satellite broadcasting mode, in addition to the analog terrestrial broadcasting mode and the digital terrestrial broadcasting mode. However, the conventional TV does not consider the cable broadcasting and the satellite broadcasting mode instead of the terrestrial broadcasting with regard to the analogous channels. Therefore, even when the identical content is retransmitted though the same channel in the cable broadcasting or the satellite broadcasting, a problem relating to the priority of the channel selection arises.

SUMMARY OF THE INVENTION

The present invention provides a broadcasting signal receiver and a control method thereof, in which a channel is selected based on a priority determined by which one of a plurality of analogous channels corresponding to various broadcasting modes providing the same contents has a channel signal, thereby allowing a user to easily watch his/her desired contents.

According to an aspect of the present invention, there is provided a method of controlling a broadcasting signal receiver having a user selection unit, including: determining whether a plurality of analogous channels exist, which correspond to a selected channel; determining whether the analogous channels have the same contents when the plurality of analogous channels exist; choosing one channel among the analogous channels according to a broadcasting mode priority when the analogous channels have the same contents; and determining whether the chosen channel provides a corresponding signal and switching the chosen channel to the following channel according to the priority when the chosen channel provides no corresponding signal.

According to another aspect of the present invention, the method further includes providing a user interface for setting the priority of broadcasting modes; and storing the priority when the priority is inputted through a user selection unit.

According to another aspect of the present invention, the choosing the channel according to a the priority includes choosing the channel according to the stored priority.

According to another aspect of the present invention, the broadcasting mode includes at least one of an analog terrestrial broadcast, a digital terrestrial broadcast, a cable broadcast and a satellite broadcast.

According to another aspect of the present invention, the priority is set in order of a digital terrestrial broadcast, a satellite broadcast, a cable broadcast and an analog terrestrial broadcast.

According to an aspect of the present invention, there is provided a broadcasting signal receiver having a signal receiver to receive a broadcasting signal, and a signal processor to process the received broadcasting signal, the broadcasting receiver including: a user selection unit that selects a channel; and a controller that determines whether a plurality of analogous channels having the same contents correspond to a channel selected through the user selection unit, choosing one channel among the analogous channels according to a broadcasting mode priority when the analogous channels have the same contents, and determining whether the chosen channel provides a corresponding signal and switching the chosen channel to the following channel according to the priority when the chosen channel provides no corresponding signal.

According to another aspect of the present invention, the broadcasting signal receiver may also include a user interface generator that generates a user interface for setting the priority of broadcasting modes, wherein the controller stores the priority to be selected in storage device when the priority is inputted through the user selection unit.

According to another aspect of the present invention, the controller chooses the channel according to the priority stored in the memory.

According to another aspect of the present invention, the broadcasting mode includes at least one of an analog terrestrial broadcasting, a digital terrestrial broadcasting, a cable broadcasting and a satellite broadcasting.

According to another aspect of the present invention, the priority is set in order of, a digital terrestrial broadcasting, a satellite broadcasting, a cable broadcasting and an analog terrestrial broadcasting.

BRIEF DESCRIPTION OF THE DRAWINGS

The above and/or other aspects of the present invention will become apparent and more readily appreciated from the following description of the exemplary embodiments, taken in conjunction with the accompany drawings of which.

DETAILED DESCRIPTION OF EXEMPLARY EMBODIMENTS

Figure 1:
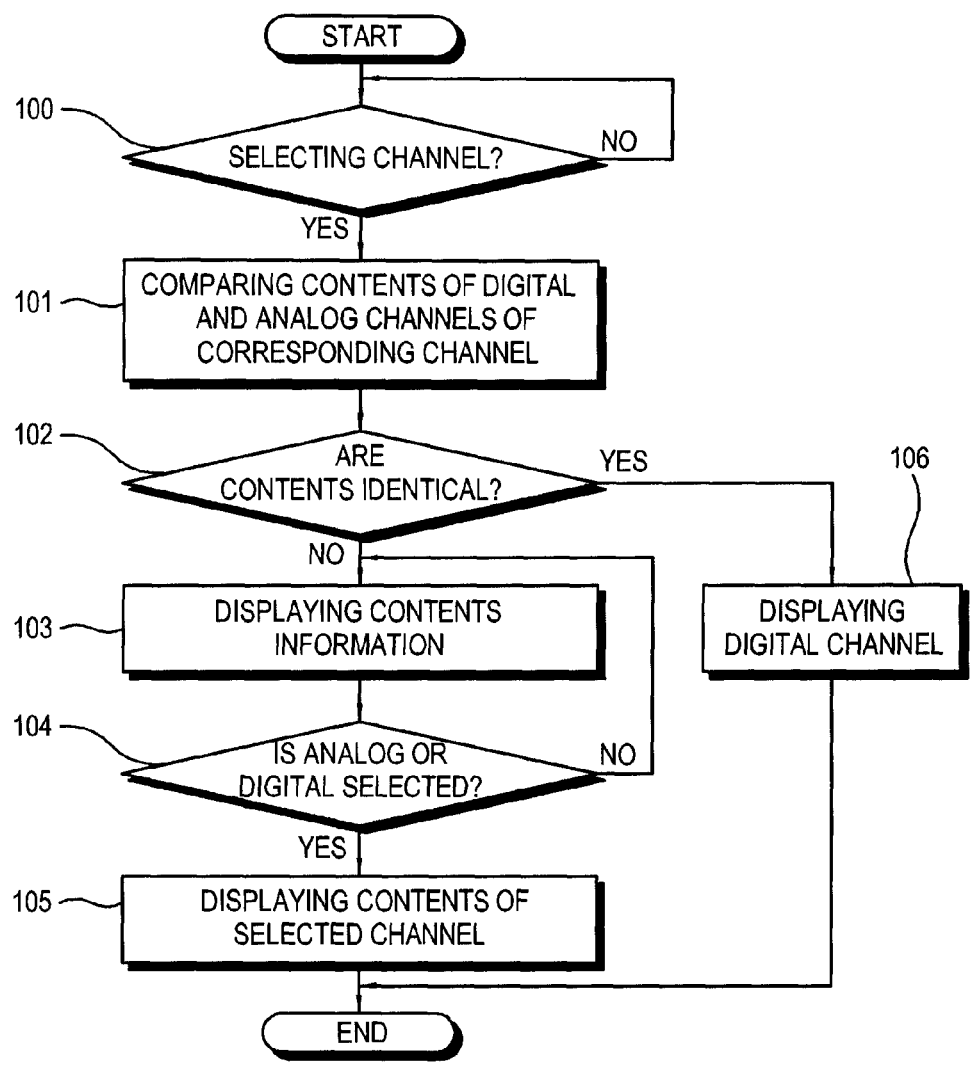
FIG. 1 is a flowchart of selecting a channel among analogous channels in a related art TV.

Reference will now be made in detail to the exemplary embodiments of the present invention, examples of which are illustrated in the accompanying drawings, wherein like reference numerals refer to like elements throughout.

Figure 2:
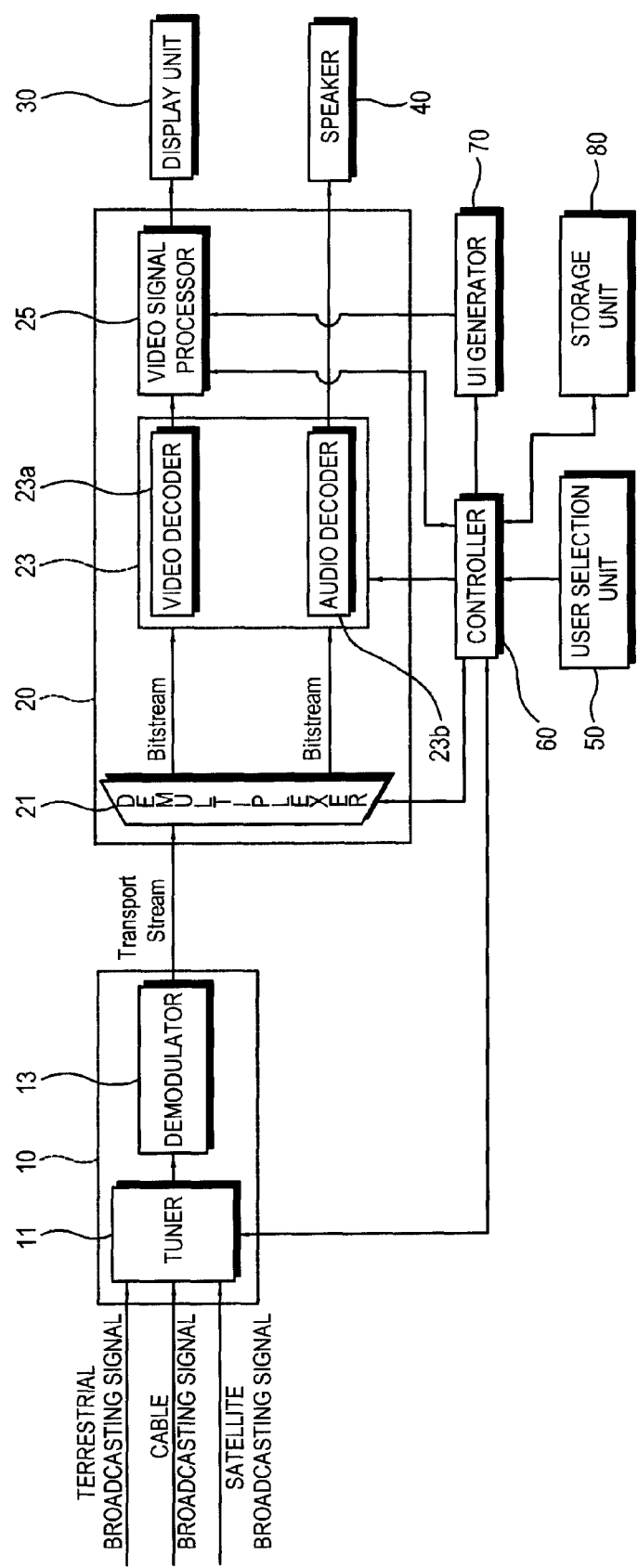
FIG. 2 is a control block diagram of a digital TV according to an exemplary embodiment of the present invention.

A digital TV will be explained as an example of a broadcasting receiver according to an exemplary embodiment of the present invention. However, the present invention is not limited to digital TV, and other devices, such as a set top box, may embody the present invention. FIG. 2 is a control block diagram of the digital TV according to an exemplary embodiment of the present invention.

As shown in FIG. 2, a digital TV according to an exemplary embodiment of the present invention includes a signal receiver 10, a signal processor 20, a display unit 30, a speaker 40, a user selector 50, and a controller 60.

The signal receiver 10 includes a tuner 11 that tunes and receives broadcasting signals according to various broadcasting modes, e.g., a terrestrial analog broadcasting signal, a terrestrial digital broadcasting signal, a cable broadcasting signal and/or a satellite broadcasting signal; and a demodulator 13 that demodulates a tuned channel signal. Here, the digital broadcasting signal is transmitted as a transport stream packetized by applying time-sharing algorithm to a video signal, an audio signal and data.

The tuner 11 is tuned to a channel, which has a frequency bandwidth corresponding to a tuning control signal of the controller 60 (to be described later), thereby selecting the broadcasting signal of the tuned channel among the received broadcasting signals. Here, the tuner 11 may either include an integrated multi tuner or separated tuners to be tuned to each of the terrestrial broadcasting signal, the cable broadcasting signal and the satellite broadcasting signal at the same time.

The broadcasting signal of the tuned particular channel is output after going through a demodulation process, an error correction process, etc. by the demodulator 13.

The signal processor 20 processes the channel signal received from the signal receiver 10 and outputs it to the display unit 30 and the speaker 40. The signal processor 20 according to the exemplary embodiment of the present invention may include a demultiplexer 21, a decoder 23, and a video signal processor 25.

The broadcasting signal of the demodulated channel is separated by the demultiplexer 21 into the video signal, the audio signal, and appendix data including contents information.

At this time, the digital broadcasting signal is output in the form of a bitstream. The video data separated by the demultiplexer 21 is decoded by a video decoder 23a, and processed by the signal processor 20, thereby being displayed on the display unit 30. Here, the display unit 30 can include various kinds of display modules such as a digital light processing (DLP), a liquid crystal display (LCD), a plasma display panel (PDP), or the like. In addition, the signal processor 20 may include a scaler to convert the video signal to have a vertical frequency, a resolution, an aspect ratio, etc. adapted for the output standard of the display unit 30.

Further, the audio signal is decoded by an audio decoder 23b and output through the speaker 40.

Meanwhile, in the case of an analog broadcasting, contents information, i.e., program information of a channel, is transmitted through vertical blanking interval (VBI). Further, in the cases of a digital terrestrial broadcasting, a cable broadcasting and a satellite broadcasting, the program information is transmitted through a program and system information protocol (PSIP) or as being included in a data table similar to the PSIP. PSIP information basically includes a system time table (STT), a master guide table (MGT), a virtual channel table (VCT), a rating region table (RRT), an event information table (EIT), and an extended text table (ETT).

The contents information is stored according to data tables in a storage unit 80 by a controller 60 (to be described later). In addition, the digital TV according to an exemplary embodiment of the present invention may configure a channel map through an automatic channel search when power is on. Here, the channel map can be used while a user selects a channel. Further, information about the channel map can be displayed on a TV screen when requested by a user.

The user selection unit 50 is used for allowing a user to select the channels and to select and release inputs of various TV functions. For example, the user selection unit 50 can include a menu key (not shown) provided in a wireless remote controller, a key signal generator (not shown) to generate a key signal corresponding to a key manipulation. Alternatively, the user selection unit 50 may be provided as a mouse, a keyboard, etc. or provided in a main body panel of the digital TV.

The controller 60 according to an exemplary embodiment of the present invention determines whether a plurality of analogous channels exist when a user selects the channel. When the analogous channels are identical in contents with each other, the controller 60 controls the tuner 11 to be tuned to a channel according to a broadcasting mode priority while considering which one of the analogous channels has a channel signal. Here, the controller 60 can be implemented by algorithm and a microcomputer or a central processing unit (CPU), which is operated by the algorithm.

In more detail, the controller 60 determines whether the analogous channels exist while a channel is selected through the user selection unit 50. When the analogous channels exist, the controller 60 determines whether the contents corresponding to the analogous channels are identical on the basis of the program information transmitted using the PSIP or the like. In the case where the analogous channels have the same contents, the controller 60 controls the tuner 11 to be tuned to a channel according to a broadcasting mode priority. At this time, if the tuned channels have a weak signal or no signal, the channel is selected according to the following priority.

Here, the priority can be established when the TV is manufactured or established by a user. For example, the digital terrestrial broadcasting providing the best picture quality can be set as the $1^{st}$ priority, the satellite broadcasting providing the next picture quality can be set as the $2^{nd}$ priority, and the cable broadcasting and the analog terrestrial broadcasting can be set as the following priorities in that order, respectively.

Thus, when the plurality of analogous channels has the same contents, a user watches desired contents through the channel selected according to the broadcasting mode priority and/or the channel providing a signal.

Further, the digital TV according to an embodiment of the present invention can include a user interface (UI) generator 70. The UI generator 70 is controlled by the controller 60 to generate a priority setting menu to allow a user to select and/or input the priority of the broadcasting modes. For example, the priority setting menu can be provided as various menus for selecting the analog terrestrial broadcasting, the digital terrestrial broadcasting, the cable broadcasting and the satellite broadcasting according to desired priorities. The priority setting menu generated through the UI generator 70 is processed by the video signal processor 25 and displayed on the display unit 30 as being synthesized with a broadcasting video signal.

With this configuration, a user manipulates a key provided in the user selection unit 50 and selects and/or inputs the desired priority through the priority setting menu displayed on the display unit 30. At this time, the controller 60 controls a storage unit 80 to store information about the priority selected by a user. Further, while a user selects a channel, the controller 60 selects the channel on the basis of the information about the priority stored in the storage unit 80 in the case where the analogous channels have the same contents.

Below, a method of selecting a channel, when there are the analogous channels in the digital TV according to an exemplary embodiment of the present invention, will be described with reference to FIG. 3.

Figure 3:
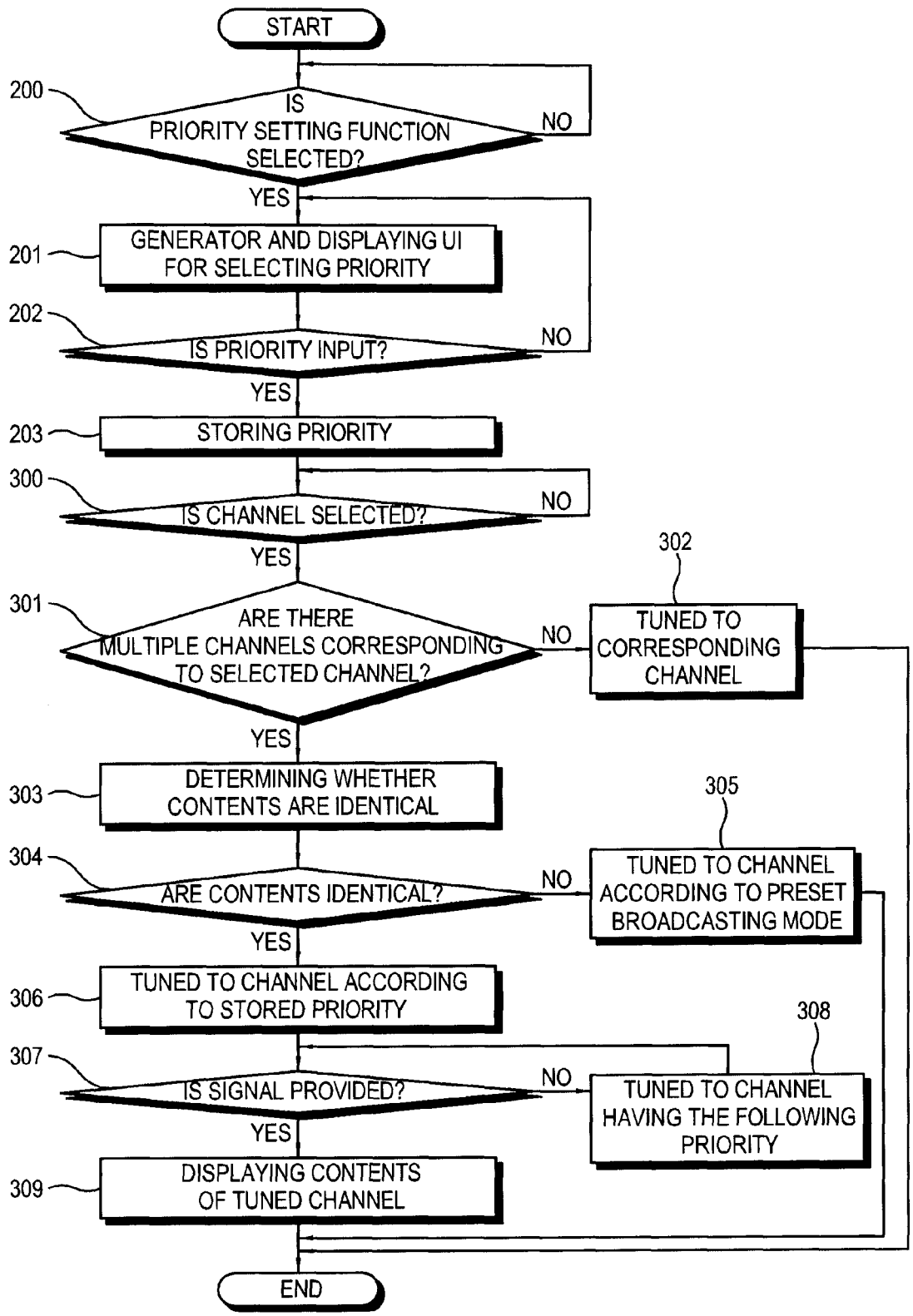
FIG. 3 is a control flowchart of the digital TV according to an exemplary embodiment of the present invention.

FIG. 3 is a control flowchart of the digital TV according to an exemplary embodiment of the present invention.

When a priority setting function is selected through a user selection unit 50 at operation 200, the controller 60 controls the UI generator 70 to generate the priority setting menu, and controls the generated priority setting menu to be processed by the video signal processor 25 and synthesized with a video signal, thereby displaying the priority setting menu on the display unit 30 at operation 201.

At operation 202, a user manipulates the key of the user selection unit 50 and inputs and/or selects a desired priority through the priority setting menu displayed on the display unit 30. For example, suppose that a user sets the priority in order of the digital terrestrial broadcasting, the cable broadcasting, the satellite broadcasting and the analog broadcasting.

At operation 203, the controller 60 controls the stores the information about the priority inputted by a user in the storage unit 80.

When a user selects a desired channel, e.g., a channel number of 11, through the user selection unit 50 at operation 300, the controller 60 determines whether the channel corresponding to the channel number selected by a user is overlapped with regard to the terrestrial broadcasting, the cable broadcasting and the satellite broadcasting at operation 301.

In the case where no analogous channels which correspond to the selected channel number of 11 exist, the controller 60 controls the tuner 11 to be tuned to a single channel corresponding to the selected channel number, and controls the contents thereof to be displayed on the display unit 30 at operation 302.

On the other hand, in the case where analogous channels exist which correspond to the selected channel number of 11, the controller 60 determines whether the contents of the corresponding analogous channels are identical on the basis of the program information received through the PSIP or the like at operations 303 and 304. For example, in the case where there exists a digital terrestrial broadcasting number of 11-1, an analog terrestrial broadcasting number of 11, a cable broadcasting number of 11 and a satellite broadcasting number of 11 as the channel corresponding to the channel number of 11, the controller 60 determines whether the contents corresponding to the respective channels are identical.

When the contents are not identical, the controller 60 controls the tuner 11 to be tuned to a channel based on a preset broadcasting mode and controls the contents thereof to be displayed on the display unit 30 at operation 305. For example, when a user watches the digital terrestrial broadcasting, the controller 60 controls the digital terrestrial broadcasting number of 11-1 to be selected. Further, when a user watches the satellite broadcasting, the controller 60 controls the satellite broadcasting number of 11 to be selected.

When the contents are identical, the controller 60 controls the tuner 11 to be tuned to a channel according to a broadcasting mode priority at operation 306. For example, in the case where a user sets the digital terrestrial broadcasting as the $1^{st}$ priority, the controller 60 controls the digital terrestrial broadcasting number of 11-1 to be selected.

After selecting the channel, the controller 60 determines whether the selected channel provides a signal at operation 307. If the display unit 30 displays no image because the selected channel provides a weak signal or no signal, the controller 60 controls the tuner 11 to be tuned to a channel corresponding to the priority to be selected at operation 308. For example, when the cable broadcasting has the $2^{nd}$ priority, the controller 60 switches the digital terrestrial broadcasting number of 11-1 to the cable broadcasting number of 11. In the case where the selected channel provides a normal channel signal, the controller 60 controls the corresponding channel signal to be displayed at operation 309. Meanwhile, these processes are repeated until the channel having a normal channel signal is selected and displayed.

Thus, a user can watch a channel of a desired broadcasting mode when there are analogous channels having the same contents. Further, when the corresponding channel provides no signal, it is switched to a channel providing a normal signal having the identical contents, thereby allowing a user to conveniently watch the contents of a desired channel.

In the foregoing exemplary embodiment, the digital TV is described by way of example, but not limited thereto. Alternatively, the present invention may be applied to a broadcasting signal receiver such as a set-top box or the like.

As described above, the present invention provides a broadcasting signal receiver and a control method thereof, in which a channel is selected by a broadcasting mode priority according to which one of a plurality of analogous channels, corresponding to various broadcasting modes providing the same contents, has a channel signal, thereby allowing a user to easily watch his/her desired contents.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling a broadcasting signal receiver, the method comprising:
   determining whether a plurality of channels which correspond to a selected channel exist;
   determining whether the plurality of channels have the same contents if it is determined that the plurality of channels exist;
   selecting a first channel among the plurality of channels according to a priority if it is determined that the plurality of channels have the same contents; and
   determining whether the first channel provides a corresponding signal; and
   selecting a second channel among the plurality of channels according to the priority if it is determined that the first channel does not provide the corresponding signal.

2. The method according to claim 1, further comprising:
   providing a user interface for setting the priority; and
   storing the priority if the priority is set through the user interface.

3. The method according to claim 2, wherein the priority is a broadcasting mode priority.

4. The method according to claim 3, wherein in the selecting the first channel and the selecting the second channel comprises the first and second channels are selected according to the stored priority.

5. The method according to claim 4, wherein the broadcasting mode comprises at least one of an analog terrestrial broadcasting, a digital terrestrial broadcasting, a cable broadcasting and a satellite broadcasting.

6. The method according to claim 1, wherein the priority is set in an order of a digital terrestrial broadcasting, a satellite broadcasting, a cable broadcasting and an analog terrestrial broadcasting.

7. The method according to claim 1, wherein the determining whether the plurality of channels have the same contents comprises determining whether the plurality of channels have the same contents based on of program information of the plurality of channels which is transmitted in a broadcasting signal received by the broadcasting signal receiver.

8. The method according to claim 7, wherein the program information is transmitted through at least one of a vertical blanking interval and a program and system information protocol.

9. The method according to claim 1, wherein if it is determined that the plurality of channels do not have the same contents, a channel is selected based on a preset broadcasting mode.

10. A broadcasting signal receiver, the broadcasting receiver comprising:
    a user selection unit which selects a channel of a broadcasting signal; and
    a controller which determines whether a plurality of channels exist which correspond to the selected channel, determines if the plurality of channels have the same contents as the channel selected through the user selection unit if it is determined that the plurality of channels exist, selects a first channel among the plurality of channels according to a priority if it is determined that the plurality of channels have the same contents, determines whether the first channel provides a corresponding signal; and selects a second channel according to the priority if the first channel does not provide the corresponding signal.

11. The broadcasting signal receiver according to claim 10, further comprising a user interface generator which generates a user interface for setting the priority,
    wherein the controller stores the priority in a storage unit if the priority is set through the user interface by the user selection unit.

12. The broadcasting signal receiver according to claim 11, wherein the priority is a broadcasting mode priority.

13. The broadcasting signal receiver according to claim 12, wherein the controller selects the first and second channels according to the priority stored in the storage unit.

14. The broadcasting signal receiver according to claim 13, wherein the broadcasting mode comprises at least one of an analog terrestrial broadcasting, a digital terrestrial broadcasting, a cable broadcasting and a satellite broadcasting.

15. The broadcasting signal receiver according to claim 10, wherein the priority is set in an order of a digital terrestrial broadcasting, a satellite broadcasting, a cable broadcasting and an analog terrestrial broadcasting.

16. The broadcasting signal receiver according to claim 10, wherein the controller determines whether the plurality of channels have the same contents comprises based on of received program information of the plurality of channels which is transmitted in a broadcasting signal received by the broadcasting signal receiver.

17. The broadcasting signal receiver according to claim 16, wherein the program information is transmitted through at least one of a vertical blanking interval and a program and system information protocol.

18. The broadcasting signal receiver according to claim 10, wherein if it is determined that the plurality of channels do not have the same contents, the controller selects a channel based on a preset broadcasting mode.

* * * * *